H. H. HARDINGE.
POWER TRANSMISSION MECHANISM.
APPLICATION FILED DEC. 31, 1909.
985,342.
Patented Feb. 28, 1911.
6 SHEETS—SHEET 1.
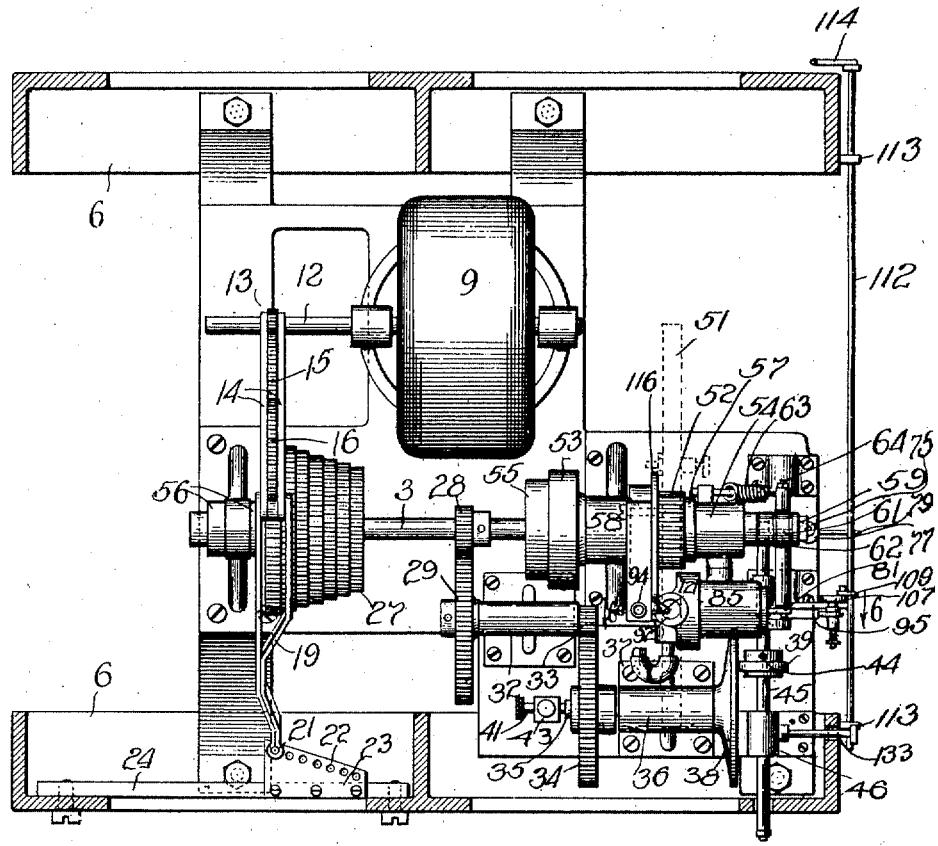
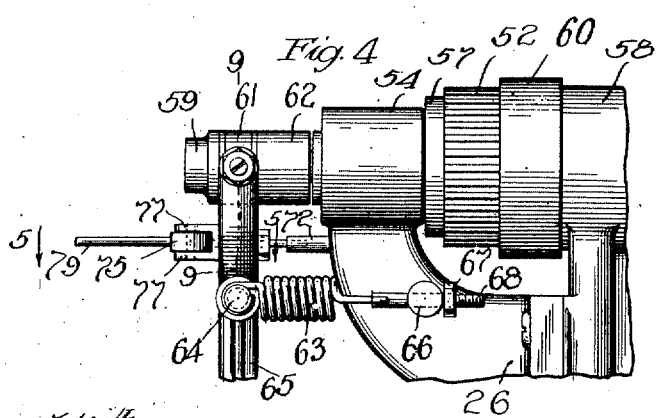
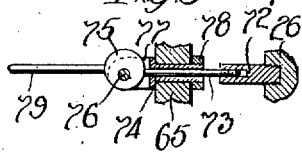
Witnesses
Inventor
Henry H. Hardinge
By Linthicum Bell & Fuller
Atty's

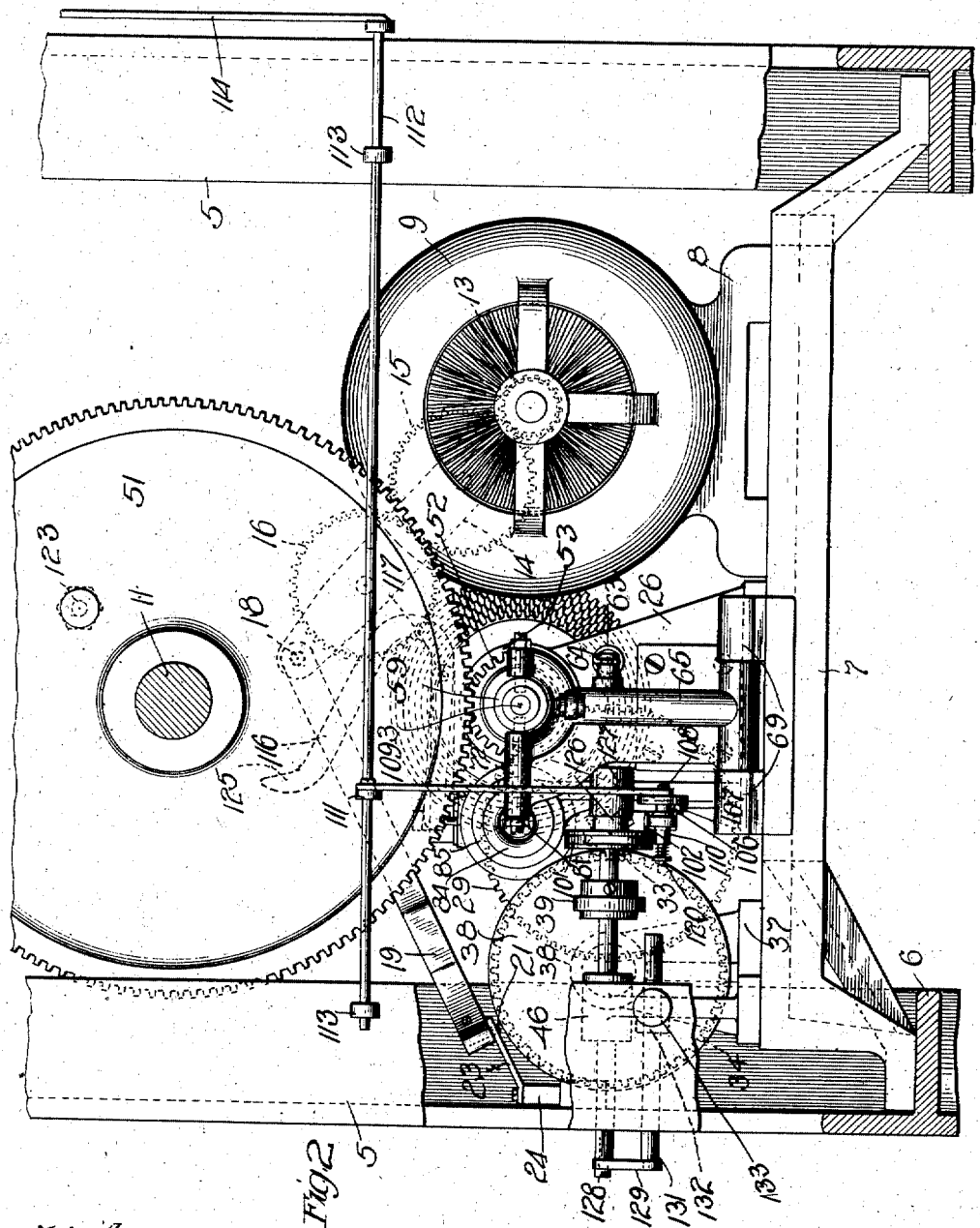

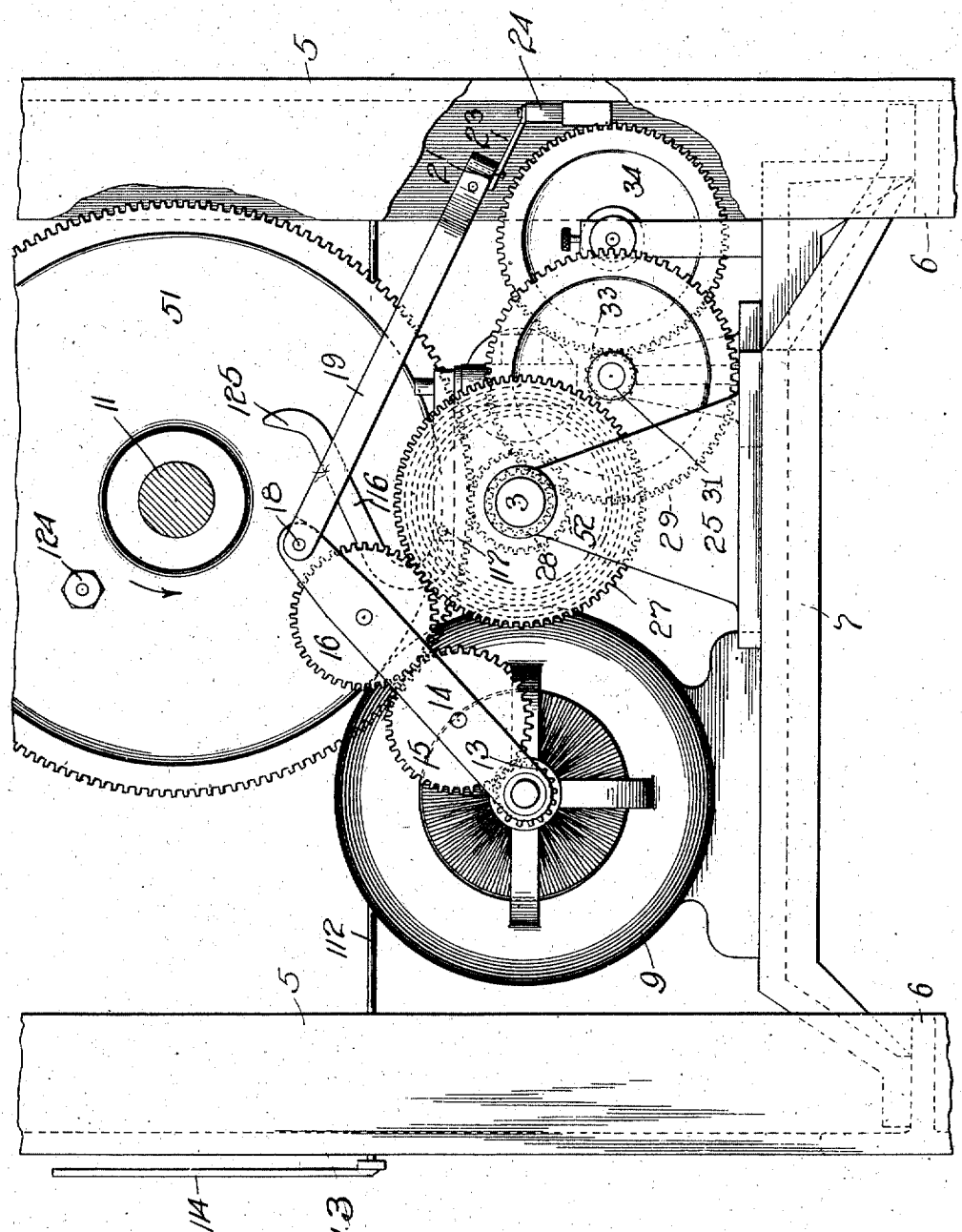

H. H. HARDINGE.
POWER TRANSMISSION MECHANISM.
APPLICATION FILED DEC. 31, 1909.

985,342.

Patented Feb. 28, 1911.
5 SHEETS—SHEET 4.

Witnesses
H. R. L. White
O. J. Wilson

Inventor
Henry H. Hardinge
By Linthicum Belt & Fuller
Attys

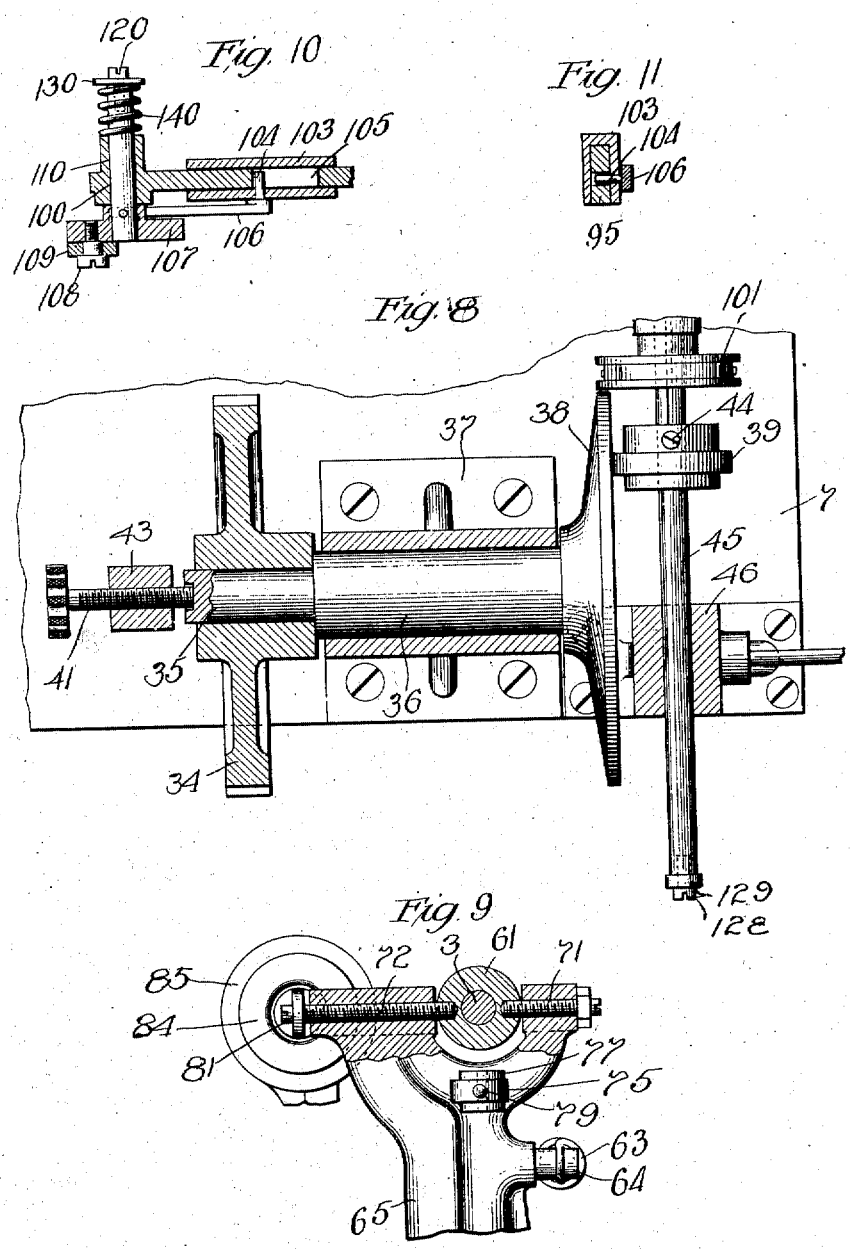

UNITED STATES PATENT OFFICE.

HENRY H. HARDINGE, OF CHICAGO, ILLINOIS, ASSIGNOR TO WIEBKING, HARDINGE & CO., OF CHICAGO, ILLINOIS, A CORPORATION OF ILLINOIS.

POWER-TRANSMISSION MECHANISM.

985,342.  Specification of Letters Patent.  Patented Feb. 28, 1911.

Application filed December 31, 1909. Serial No. 535,745.

*To all whom it may concern:*

Be it known that I, HENRY H. HARDINGE, of the city of Chicago, county of Cook, and State of Illinois, have invented certain new and useful Improvements in Power-Transmission Mechanisms, of which the following is a specification.

This invention relates to improvements in power transmitting mechanisms wherein it is desirable to transmit power from a continuously rotating drive shaft to an intermittently rotated driven shaft, and wherein it is necessary that the length of dwell between the successive rotations of the driven shaft be capable of variation to suit the exigencies of the particular machine with which the invention is to be employed.

My invention is particularly adaptable for use in connection with certain type-casting machines, as for example, a machine of the general character set forth in U. S. Patent 926,740 granted to me on July 6, 1909. In this as well as in all other type-casting machines, the molten metal must be retained in the mold a sufficient length of time to allow it to harden before it can be removed, and this hardening period is of course dependent upon the size of the type being cast. By employing my power transmitting device, to be hereinafter fully described, in connection with such a machine the operation of the type-casting machine can be delayed for a variable predetermined period to allow the metal in the mold to harden sufficiently to be handled.

While I have mentioned my invention as being particularly adapted for use in connection with type-casting machines, it will be obvious that it may be employed wherever desirable to impart an intermittent rotary motion to a driven shaft from a constantly rotating driving shaft.

My invention will be best understood by referring to the following description when taken in connection with the accompanying illustration of one specific embodiment thereof, while its scope will be more particularly pointed out in the appended claims.

Figure 6:
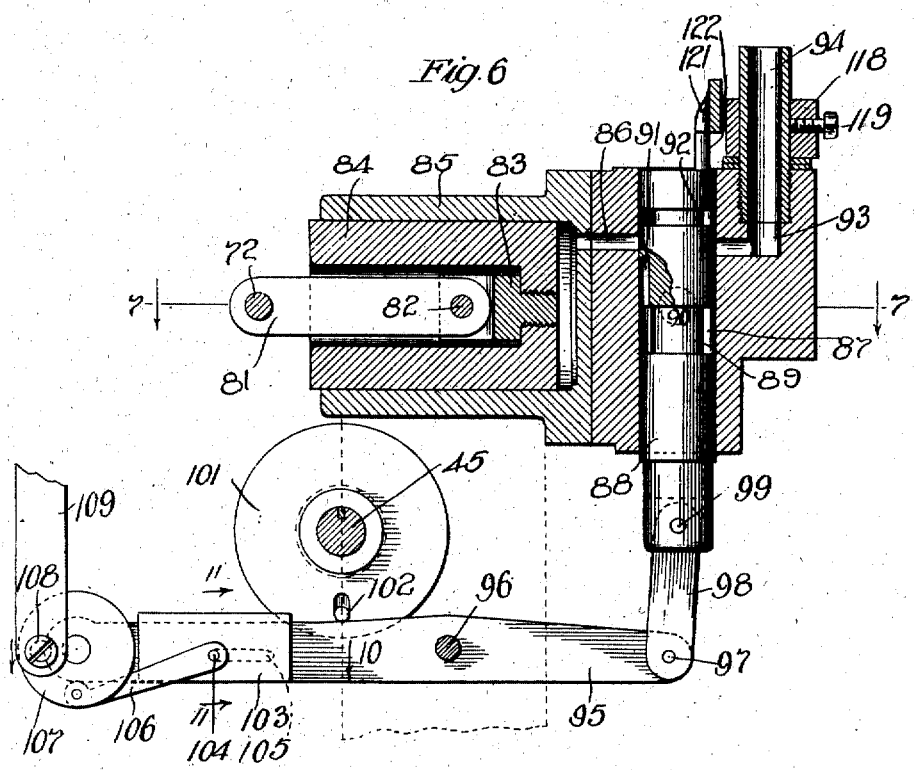
Figure 7:
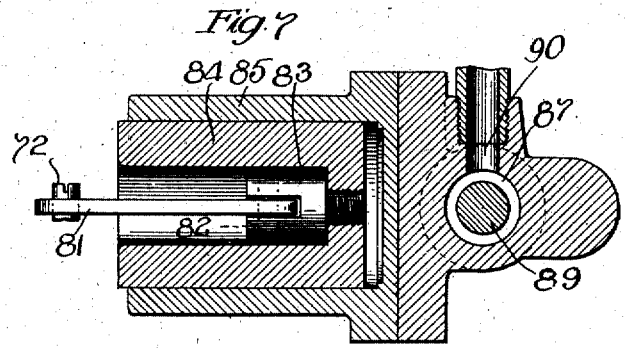

In the accompanying drawings, Figure 1 is a plan view of my invention. Fig. 2 is an end elevation thereof looking toward the left in Fig. 1. Fig. 3 is an elevation looking at the other end of the device. Fig. 4 is an enlarged view of one end of the drive shaft showing the spring for normally holding the clutch in inoperative position. Fig. 5 is a sectional view on the lines 5—5 of Fig. 4. Fig. 6 is an elevation of the mechanism which controls the clutch actuating piston, the piston chamber and valve chamber being shown in section on the line 6—6 of Fig. 1. Fig. 7 is a section on line 7—7 of Fig. 6. Fig. 8 is an enlarged plan of the friction disk and roller, the bearing and gear wheel being shown in section. Fig. 9 is a sectional elevation taken on line 9—9 of Fig. 4. Fig. 10 is a section taken on line 10—10 of Fig. 6. Fig. 11 is a section taken on line 11—11 of Fig. 6.

In the drawings the vertical side pieces 5 which form the supporting standards for the machine in connection with which my invention is to be employed, are provided at any desired or convenient height, with shelves 6 upon which is secured the bed or supporting frame 7, by bolts or other securing means. The bed 7 carries a motor base 8, upon which is mounted a motor 9 in the usual manner. While I have shown an electric motor in connection with my invention, it is to be understood that this motor may be replaced by any other desired or preferable form of power generator. Upon the motor shaft 12 is splined a spur-gear 13, which is held in place longitudinally thereon by the parallel members 14 which carry the pinions 15 and 16 rotatably mounted therebetween so that power may be transmitted to 16 from the spur-gear 13 through the pinion 15. The upper ends of the members 14 are pivotally connected at 18 to a forked-shaped member 19 provided at its free extremity with a downwardly projecting engaging pin 21. This pin is adapted to be positioned in any one of a series of holes 22 in a plate 23 secured upon a bar 24 which is attached by screws to the side piece 5. By positioning the pin 21 in any desired hole along the plate the pinion 13 and the members 14 carrying the pinions 15 and 16, may be adjusted to any desired position longitudinally of the motor shaft. Upon the bed 7 are also mounted supports or standards 25 and 26 providing bearings for the drive shaft 3, which is supported therein so as to be capable of slight longitudinal movement relatively to the bearings. The drive shaft has secured thereto a plurality of gears 27 of varying sizes adapted to be singly engaged by the pinion 16. It will be obvious that the rotation of the drive shaft may be regulated to any desired rate by setting the pin 21 in the proper hole to bring the pinion 16 into mesh with the proper sized gear 27. The holes 22 in the plate 23 are situated at varied distances from the motor shaft, in order that the pinion 16 may be held at the proper height to mesh with the particular gear 27 over which it has been adjusted. Intermediate its ends the drive shaft 3 has secured thereon a pinion 28 adapted to mesh with the gear 29 fastened upon one end of an intermediate shaft 31, mounted in a suitable bearing 32 on the bed, and said shaft has fixed thereto, at its other end, a pinion 33 adapted to engage and drive a gear 34 secured upon the reduced end 35 of a shaft 36 mounted in a suitable bearing 37. Said shaft 36 is provided at its other end with a friction disk 38 secured thereto and against the face of which a roller 39 is adapted to press and be rotated thereby. The shaft 36 can be longitudinally adjusted by means of a thumb-screw 41 engaged in a standard 43, as clearly shown in Fig. 8, to bring the friction disk in proper relation to the friction roller.

The roller 39 is secured by means of a set screw 44 or other preferred fastening means, upon a spindle 45 supported near one end in a suitable bearing on a standard 46 mounted upon the bed 7. The other end of said spindle is splined or otherwise secured within a sleeve 126 so as to impart to said sleeve a rotary motion, but to be capable of longitudinal movement relatively thereto, said sleeve being rotatably mounted in a bearing 127. When the friction disk has been properly adjusted by means of the thumb-screw 41, its face frictionally engages the roller 39, and when motion is imparted to the drive shaft 3, the roller 39 and the spindle 45 are given a constant rotation from the drive shaft through the intermediate pinions and gears 28, 29, 33 and 34 respectively.

The drive shaft 3 is adapted through intermediate connections hereinafter described, to drive the shaft 11, which will be known as the driven shaft, and which corresponds in my patent above mentioned, to the cam shaft 11 therein disclosed. Upon the driven shaft is mounted and secured a gear wheel 51 adapted to mesh with and be driven by a pinion 52, secured upon a sleeve 57 surrounding and rotatable independently of the drive shaft 3. The forked standard 26 provides a plurality of bearings for the sleeve and drive shaft. This sleeve and drive shaft are adapted to be connected by means of a friction clutch, one member 53 of which is secured upon the sleeve 57 and the other member 55 of which is rigidly fastened upon the drive shaft. By imparting to the drive shaft a longitudinal movement the member 55 may be adjusted into and out of engagement with the member 53, thereby connecting and disconnecting the driven and drive shafts. The longitudinal movement of the drive shaft is limited by the collars 56 secured to the shaft on either side of the bearing in the standard 25 spaced a sufficient distance from the bearing to permit the shaft a limited longitudinal movement.

Referring now more specifically to Fig. 4, it will be seen that the standard 26 is of yoke shape, the left hand portion 54 providing a bearing for the drive shaft 3, while the right hand portion 58 surrounds and acts as a bearing for the aforementioned sleeve 57. The pinion 52 secured to said sleeve is held in place between the two arms of the standard 26 as shown. Upon the outside end of the shaft 3 is secured a cap 59 which prevents a collar 61 loosely mounted on said shaft from slipping off its end and serves as a bearing face against which the collar may thrust when it is drawn outwardly, as will be hereinafter described, to impart to the drive shaft a longitudinal movement for the purpose of bringing the clutch member 55 into engagement with the member 53, and thereby imparting through the sleeve 54 and pinion 52, a rotary movement to the gear 51. A ring 62 is also rigidly secured upon the drive shaft just inside the collar 61 to provide a thrust shoulder for the purpose of thrusting said shaft inwardly to release the clutch when the collar 61 is forced against it. This inward movement of the shaft to release the clutch, is accomplished by a coiled tension spring 63 secured at one end to a stud 64 projecting from the side of the yoke 65 and at its other end to a lug 66 upon the standard 26. The tension of this spring may be adjusted by means of a thumb-nut 67 upon a rod 68 extending through said lug and to one end of which the coil spring 63 is attached by inserting one end thereof through an opening in the rod or by any other preferred form of fastening.

The yoke 65 as clearly shown in Fig. 2, is extended laterally at its lower end to rest in bearings 69 secured to the bed, and is adapted to be rocked in these bearings inwardly and outwardly in a manner hereinafter to be described. The yoke at its upper end is tapped on either side for the reception of screws 71 and 72, which extend through the sides of the yoke and into the collar 61, as clearly shown in Fig. 9. It will be evident that when the yoke is rocked inwardly or to the right, looking at Fig. 4, by the spring 63, it will thrust the collar 61 against the ring 62 secured upon the drive shaft, and impart to said shaft a longitudinal movement inwardly to release the clutch members, and thereby disconnect the line of transmission between the drive shaft and the driven shaft. When the drive shaft is held in its innermost position with the clutch members disengaged, the contractional force of the spring 63 will cause the inner edge of the gear 52 to frictionally engage with the shoulder 60 of the bearing 58, and thereby act as a brake to stop the rotation of the sleeve 57 and consequently the operation of the machine which is actuated from the driven shaft 11. I have found in some instances that it is desirable to interpose a friction disk between the shoulder 60 and the edge of the gear 52 to increase their frictional engagement and thereby accelerate the stoppage of the machine. For the purpose of releasing said gear and shoulder from frictional engagement without throwing the main clutch into action so that the machine may be turned over by hand when desired, I have provided a means for moving the drive shaft outwardly a short distance and holding it in that position, which is best illustrated in Figs. 4 and 5.

Tapped into the outer arm of the standard 26, is a lug 72', and screwed into the lug is an outwardly projecting stem 73 which extends through a bearing portion 74 in the yoke 65 and is adapted to be engaged by a cam member 75 pivotally mounted on a bearing 76, between ears 77, integral with the said bearing portion. The bearing portion is secured to said yoke by means of a nut 78 as shown in Fig. 5. An operating handle 79 on the cam provides a means by which the cam may be rotated on its bearing, to engage the rigid stem 73 and force the yoke 65 and the drive shaft 3 outwardly. The frictional engagement between the cam and the stem will hold the edge of the gear 52 away from the shoulder 60 so that the machine is free to be turned over by hand.

The mechanism for intermittently bringing the clutch members into engagement when an intermittent rotation of the driven shaft is desired, as for instance when my invention is to be used in connection with type-casting machines as before mentioned, will now be described.

To the outer end of the pin 72 in the head of the yoke 65, is attached a link 81 secured by a pin 82 between the projecting ears of a stud 83, tapped into the head of a piston or plunger 84, which is adapted to be reciprocated in the cylinder 85. When the piston is forced outwardly or to the left, viewing Figs. 6 and 7, it will be apparent that through the instrumentality of the link 81, the yoke 65 will be rocked and the drive shaft thrust outwardly. I prefer to employ for moving the piston 84, compressed air, but I do not wish to limit myself to this particular method of moving the cylinder as the same results might be obtained if the link 81 were moved by any other means. In the embodiment disclosed, however, referring particularly to Fig. 6, I have connected the interior of the cylinder with the compressed air supply through a passage 86 opening into a valve chamber 87. Mounted to reciprocate in this chamber is the slide or cut-off valve 88 which is reduced at 89 to provide a chamber opposite the inlet port 90 shown in dotted lines in Fig. 6, which connects with the compressed air supply. Extending along the valve side from the reduced part, is a channel 91, which when the valve is raised, is adapted to register with and uncover the passage 86, thereby admitting to the cylinder the air under a pressure which is sufficient to move the piston outwardly. When the valve is moved downwardly the passage 86 is cut off from the pressure supply and a reduced portion 92 is brought into registration therewith, which connects through the other side of the casing with an outlet 93. Into this outlet is tapped an exhaust pipe 94. When the valve is raised and pressure admitted to the cylinder, the drive shaft will be thrust to the right, viewing Fig. 1, thereby closing the clutch. When the valve is lowered the port 86 is first closed to the compressed air, then opened to the exhaust, whereupon the piston is forced back into the cylinder by the spring 63 acting upon the yoke 75, and the clutch is opened. For the purpose of raising the valve to admit air under pressure, to the cylinder at a predetermined time, I have provided a lever 95 fulcrumed at 96, and pivotally connected at 97 to the link 98, which in turn is attached at 99 to the valve body.

As has been previously described, the spindle 45 is given a continual rotary movement from the drive shaft through the instrumentality of the intermediate gears and the friction disk acting upon the roller 39. Said spindle is splined, so that it is capable of longitudinal movement, to a disk wheel 101, secured on one end of the sleeve 126 and which is provided with a pin 102 extending out from one of its faces and adapted upon rotation of the wheel to engage with a block 103 slidably mounted near the outer end of the lever 95. This block as clearly shown in Figs. 10 and 11, is of channel shape and sets down over the top of the lever 95. It has secured thereto by a pin 104, extending through one side of the block and into a slot 105 in the lever 95, a connecting link 106 in turn attached at its other end to a disk 107 secured to a pin 100 extending through and supported by a bearing 110 in the end of the lever 95. The pin 100 extends some distance beyond the outer end of the bearing 110 and has fixedly secured upon its end by a screw 120, a disk 130. Interposed between said disk 130 and the bearing 110, is a coiled spring 140 one end of which is secured to the bearing, and the other to said disk, and which tends normally to retain the disk 107 and keep the block 103 in the normal position shown in Fig. 6. In this position of the block on the lever 95, each revolution of the spindle 45 and disk 101, will cause the pin 102 to engage the block, thereby depressing the outer end of the lever 95 and momentarily raising the valve body so that the port 86 may be opened to the compressed air. By sliding the block along toward the end of the lever 95 it can be removed from the path of the pin 102, and since said lever itself is outside the path of said pin, no movement of the valve would be produced by the rotation of the disk 101. In order that the block may be thus withdrawn by the operator when it is desired to stop the driven shaft for any reason, I have connected to the disk 107 by a screw 108, a link 109, which is secured at its upper end to an arm 111 projecting out from a rock shaft 112 mounted on bearings 113 on the frame sides, as clearly shown in Fig. 2, and provided with an operating handle 114. By swinging the operating handle thus rocking the shaft and raising the link 109, the disk 107 is rotated, withdrawing the block by means of the link 106 from the path of the revolving pin. As long as the block is held in this position, although the disk 101 continues to revolve, the drive shaft will be retained in its innermost position by the spring 63, and the connection between the drive and driven shafts will be broken at the clutch. In the normal operation of the mechanism, however, the controlling valve 88 will be positively raised at regular predetermined intervals, thereby permitting the clutch to be closed.

In order that the controlling valve may be depressed to release the pressure in the cylinder at a predetermined time, I have provided a device under the control of the driven shaft for positively depressing said valve after said shaft has completed one revolution. As best shown in Figs. 2 and 3 this valve depressing mechanism consists of a U-shaped lever 116 pivotally mounted at 117 upon an outwardly extending bracket 118 secured to the exhaust pipe 94 by a set screw 119, Fig. 6. The lever 116 when mounted upon this bracket is so positioned that its lower end which is provided with an enlarged bearing face 121, is directly over a lug or pin 122, integral with or secured to the upper end of the valve 88. The upper end of the lever projects into the path of a pin 123, extending through and secured to the gear wheel 57 by a nut 124 as shown in Figs. 2 and 3. When the valve 88 is in raised position the upwardly turned end 125 of the lever 116, is elevated thereby into a position to be engaged by the pin 124 as the wheel revolves in the direction shown by the arrow in Fig. 3. The engagement of the pin with the lever depresses the lower end of the lever which acts upon the stud 122 and positively forces the valve 88 downwardly, thereby opening the same. It will thus be seen that the valve is positively depressed to permit the clutch to be opened at each revolution of the driven shaft.

As has been previously explained, the controlling valve is positively raised to permit the clutch to be closed at regular intervals, dependent upon the time required for the disk 101 to make one revolution. It may often be desirable to lengthen or shorten this interval between the successive raising of the valve and consequent closing of the clutch, to suit the exigencies of the particular machine to which my invention is to be applied, and in order to provide for such variation I have mounted the spindle 45 so that it is capable of longitudinal adjustment to bring the friction roller 39 nearer to or farther from the center of the friction disk 38, thereby varying the speed at which the spindle is rotated. To accomplish this end the spindle is loosely mounted in the bearing 46, and has secured to its outer end by means of a screw 128, a downwardly extending arm 129 integral with an adjusting rod 131 which projects inwardly through a bearing 132 below the bearing 46 for the spindle. A set screw 133 projects into the bearing 132 and when the rod has been longitudinally adjusted until the roller 39 occupies the proper position against the face of the friction disk 38 to give the desired speed to the spindle 46, the said spindle may be locked from longitudinal movement by tightening the set screw 133 until it holds the rod 131 against movement, whereby the speed necessary to give the desired dwell between the opening and the closing of the clutch, is imparted to the spindle.

A continuous rotation may be given to the driven shaft when desired by simply withdrawing the pin 123 from the gear 51 so that the valve restoring lever 116 will not be operated to depress the controlling valve. In that event the clutch would be held in closed position by the air pressure in the cylinder acting continuously against the piston.

While I have illustrated and described a preferred embodiment of the invention, I am aware that it may be carried out in many other forms than that shown, without departing from the scope thereof, as expressed in the claims. Therefore, I no not wish to be limited to details shown, but What I do claim is:

1. A power transmitting mechanism comprising in combination, a drive shaft, a driven shaft, means under control of the drive shaft for connecting said shafts, and means controlled by said driven shaft for disconnecting said shafts.

2. A power transmitting mechanism comprising, a drive shaft, a driven shaft, mechanism including a clutch connecting said shafts, means controlled by the drive shaft for actuating said clutch in one direction, and means controlled by the driven shaft for actuating said clutch in the other direction.

3. In a power transmitting mechanism, a drive shaft, a driven shaft, mechanism including a clutch connecting said shafts, automatic means for closing said clutch, automatic means for opening said clutch and manually controlled means for moving one member of the clutch against the force of the clutch opening means to permit free rotation of the driven shaft.

4. A power transmitting mechanism comprising, a drive shaft, a driven shaft, mechanism comprising a clutch for connecting said shafts, means tending to normally retain the clutch in open position and pneumatic means for automatically closing said clutch at predetermined intervals.

5. A power transmitting mechanism, comprising a drive shaft, a driven shaft, operative connections including a clutch for connecting said shafts, means for constantly urging said clutch toward open position, and automatically controlled pneumatic means for closing said clutch at predetermined intervals against the force of said opening means.

6. In a power transmitting mechanism, the combination of a drive shaft, a driven shaft, mechanism including a clutch for connecting said shafts, a pneumatic device for actuating said clutch, continuously rotating mechanism for causing the operation of the pneumatic device at predetermined intervals, and adjustable means for varying the length of said intervals.

7. In a power transmitting mechanism, the combination of a drive shaft, a driven shaft, operative connections including a clutch between said shafts, a pneumatically operated device for actuating said clutch, an intermittently actuated mechanism for controlling the operation of said device, and means comprising a friction disk and an adjustable roller for determining the frequency of actuation of the said mechanism.

8. In a power transmitting mechanism, the combination of a drive shaft, a driven shaft, connecting means including a clutch interposed between said shafts, a pneumatically operated device for actuating said clutch, means for controlling the operation of said device, a continuously rotated member adapted to intermittently actuate said controlling means, and adjustable mechanism for regulating the speed of said continuously rotating member, whereby the drive and driven shafts may be connected and disconnected at regular predetermined intervals.

9. In a power transmitting mechanism, a drive shaft, a driven shaft, a connecting mechanism including clutch interposed between said shafts, and means for intermittently actuating said clutch comprising a pneumatic device for closing said clutch, mechanism for automatically controlling said closing device, and means for opening said clutch.

10. In a power transmitting mechanism, a drive shaft, a driven shaft, connecting instrumentalities including a clutch interposed between said shafts, and means for intermittently actuating said clutch comprising a pneumatically operated device for closing said clutch, mechanism for automatically controlling said closing device, and independent means for automatically opening said clutch.

11. In a power transmitting mechanism, a drive shaft, a driven shaft, mechanism including a connecting clutch interposed between said shafts, and means for intermittently actuating said clutch comprising a valve controlled, pneumatically operated device for closing said clutch, mechanism for automatically controlling said closing device and independent automatic means for opening said clutch.

12. In a power transmitting mechanism, the combination of a clutch, and means for closing said clutch comprising a pneumatically operated piston, a controlling valve therefor, a continuously rotating means for intermittently actuating said valve, and adjustable mechanism for regulating the speed of said rotating means whereby the interval between successive valve actuations may be varied.

13. In a power transmitting mechanism, the combination of a longitudinally movable drive shaft, a driven shaft, a clutch connection between such shafts, a yoke secured to a collar on said drive shaft, resilient means for normally holding said yoke in one position and automatic means for intermittently thrusting said yoke in the other direction to actuate said clutch, substantially as described.

14. In a power transmitting mechanism, the combination of a longitudinally movable drive shaft, a driven shaft, means including a clutch for connecting said shafts, one member of said clutch being secured on said drive shaft, means for normally retaining the drive shaft with the clutch in inoperative position, manual means for moving said drive shaft longitudinally a limited distance against the force of said retaining means and means for automatically closing said clutch.

15. In a power transmitting mechanism, the combination of a longitudinally movable drive shaft, a driven shaft, mechanism including a clutch connecting said shafts, a device for closing said clutch, a pneumatic controlling mechanism therefor and means for positively actuating said controlling mechanism in opposite directions.

16. In a power transmitting mechanism, a drive shaft, a driven shaft, mechanism including a clutch connection between said shafts, means for normally retaining said clutch in inoperative position, a pneumatically operated device for closing said clutch, a controlling valve therefor, means for intermittently closing said valve, and separate means for positively opening said valve.

17. In a power transmitting mechanism, in combination, a clutch, a pneumatically operated device for actuating said clutch, a controlling valve therefor, a lever for closing said valve, a block slidable on said lever, normally positioned in the path of a continuously rotating pin, and means for withdrawing said block from the path of said pin.

18. In a power transmitting mechanism, the combination of a clutch, a pneumatically operated device for actuating said clutch, a controlling valve therefor, a lever for closing said valve, a sliding block mounted on said lever, a rotatable disk connected to said block, and manual means for rotating said disk to withdraw the block from its operative position.

19. In a power transmitting mechanism, the combination of a drive shaft, a driven shaft, connection including a clutch between said shafts, a pneumatically operated device for actuating said clutch, a controlling valve for said device, means for intermittently closing said valve, and means comprising a pivotally mounted lever having one end adapted to engage the top of said valve and the other end positioned in the path of a rotating pin operated from said driven shaft, for positively opening said controlling valve.

20. In a power transmitting mechanism, the combination of a drive shaft, a driven shaft, a clutch, a pneumatically operated device for actuating said clutch, a controlling valve for said device, means under the control of the driving shaft for closing said valve, and means under the control of the driven shaft for opening said valve.

21. In a power transmitting mechanism, a longitudinally movable shaft, a yoke connected to one end of said shaft, pneumatic means for positively swinging said yoke to move the shaft longitudinally in one direction, and resilient means for returning said shaft to normal position.

22. In a power transmitting mechanism, a longitudinally movable drive shaft, a clutch, a yoke secured to said drive shaft, automatic means connected to said yoke for positively moving said drive shaft in one direction to close the clutch at regular predetermined intervals, and means to open the clutch and retain said drive shaft in its normal position.

23. In a power transmitting mechanism, the combination of a longitudinally movable drive shaft, a driven shaft, means including a clutch for operatively connecting said shafts, resilient means for normally holding said clutch in open position, automatic means for closing said clutch at predetermined intervals, and manual means for holding said drive shaft in a position intermediate the limits of its longitudinal movement.

24. In a power transmitting mechanism, the combination of a longitudinally movable drive shaft, a device for yieldingly retaining said shaft at one limit of its longitudinal movement, automatic means for intermittently moving said shaft to the other limit of its longitudinal movement, and manual means for positioning and holding said shaft in an intermediate position.

25. In a power transmitting mechanism, the combination of a drive shaft, a driven shaft, mechanism including a clutch for operatively connecting said shafts, means actuated by the drive shaft for closing said clutch, a device tending normally to open said clutch, and mechanism operated from the driven shaft to permit at regular intervals the operation of the clutch opening device.

26. In a power transmitting mechanism, the combination of a drive shaft, mechanism including a clutch for operatively connecting said shafts, mechanism actuated from the drive shaft for closing said clutch, said mechanism including a block normally disposed in the path of a continuously moving member, and manual means for displacing said block to prevent the operation of the clutch closing mechanism.

27. In a power transmitting mechanism, the combination of a drive shaft, a driven shaft, operative connections including a clutch between said drive and driven shafts, a spring for normally retaining said clutch in open position, a pneumatic device for closing said clutch against the force of said spring, a valve controlling the operation of said pneumatic device, means for actuating said valve comprising a pivotally mounted lever, a pin secured to a continuously rotating disk and adapted to engage said lever and swing it about its pivot to actuate the valve, driving connections between said disk and the drive shaft, and an adjusting device whereby the speed of said disk may be varied.

28. In a power transmitting mechanism, the combination of a drive shaft, a driven shaft, means including a clutch for operatively connecting said shafts, a device tending normally to retain said clutch in open position, mechanism for closing said clutch at predetermined intervals, said mechanism including a pneumatic device, a continuously rotating disk provided with a laterally projecting pin, a pivotally mounted lever located in the path of said rotating pin and operatively connected to said pneumatic device, a frictional driving means for said disk, a train of gears interposed between said frictional driving means and the drive shaft, and a device operatively connected to the driven shaft and adapted upon each rotation of the driven shaft to throw the clutch closing means out of operation whereby to permit the clutch to be opened by the clutch opening device.

HENRY H. HARDINGE.

Witnesses:
 I. J. WILSON,
 G. E. HOLMES.